United States Patent Office 2,986,524
Patented May 30, 1961

2,986,524
MANUFACTURE OF ELECTRETS AND ARTICLE SO PRODUCED
Edward D. Padgett, Bldg. 1-D-15, 100 Franklin St., Morristown, N.J.
No Drawing. Filed Dec. 21, 1959, Ser. No. 860,650
5 Claims. (Cl. 252—63.2)

The invention relates to a method for the manufacture of electrets and to the article so produced. More particularly, it pertains to the production of electrets having a relatively high melting point wax and ester gum as constituents, and includes correlated improvements and discoveries whereby their preparation is facilitated and their properties enhanced.

An object of the invention is the provision of a method for the manufacture of electrets in accordance with which a composition containing a wax is caused to acquire opposite electric charges on opposite surfaces.

A further object of the invention is to provide a method in accordance with which electrets may be manufactured readily, and efficiently, to the desired extent.

Another object of the invention is to provide a method for the production of electrets the charges on the surfaces of which will be relatively stable and maintained for considerable periods of time.

An additional object of the invention is to provide a method in accordance with which an electret may be produced, having a wax of relatively high melting point and ester gum as constituents, and which is produced by cooling a molten mass in an electric field over or during a definite period of time.

Other objects of the invention will, in part, be obvious and will, in part, appear hereinafter.

The invention accordingly comprises the several steps and relation of one or more of such steps with respect to each of the others, and the article possessing the features, properties and the relation of constituents which are exemplified in the following detailed disclosure and the scope of the invention will be indicated in the claims.

In the practice of the invention, an electret may be produced by preparing a molten mass containing a wax having a melting point of at least 40° C. and ester gum, and cooling the molten mass to solidification, desirably to a temperature which is at least as low as 18° C. and may be as low as 0° C., in an electric field in which the electrical impress is from about 3,000 to about 12,000 volts per centimeter and during a period from about 0.5 to about 5 hours, desirably from one to about two hours. Moreover, a variable electric field may be employed. Thus, the initial applied electric field would have a magnitude below that value which would cause turbulence in the mass, and thereafter, the magnitude would be increased as the soft, or plastic, mass solidifies. Accordingly, an initial electric field of 3,000 volts per centimeter and a final value of 9,000 volts per centimeter could be utilized.

The wax having a relatively high melting point may be selected from the group consisting of carnauba, sugar cane, montan, ozocerite, spermaceti, beeswax, ouricury, japan, bayberry, candelilla, Chinese and Chinese insect. The preferred wax is carnauba. In addition to the wax and ester gum, the electret may contain minor proportions of other constituents as ethyl cellulose, a methacrylate resin and a titanium compound and specifically titanium dioxide and barium titanate.

The meaning of various expressions as used herein will be understood to be as follows:

*Ester gum.*—A hard synthetic resin produced by esterification of rosin, namely, the glycerol, glycol and pentaerythritol esters of high molecular weight and a high melting point, i.e., above 200° F.

*Hydrogenated rosin.*—Product obtained by subjecting rosin to hydrogenation to an extent such that about 50% of the ethylene linkages has been satisfied.

*Ethyl cellulose.*—A white granular solid in which hydroxyl radicals of cellulose have been replaced by ethoxy group ($OC_2H_5$) and having a specific gravity from 1.05 to 1.25.

*Methacrylate resin.*—A solid ester of methacrylic acid polymerized by the action of heat, light or benzoyl peroxide having a specific gravity from 1.16 to 1.20.

The composition in which various constituents may be present, may vary within a wide range. Thus, an electret composed of carnauba wax and ester gum may have a wax content from about 10% to about 90% with the remainder being ester gum. Further, when ethyl cellulose is included along with hydrogenated rosin, ester gum and carnauba wax, the percentages may be from about 30% to about 50% of ester gum; from about 2% to about 20% of ethyl cellulose; from about 10% to about 50% of carnauba wax, and from about 1% to about 10% of hydrogenated rosin.

When a titanium compound is included, as in a composition containing carnauba wax and ester gum, the titanium compound, as titanium dioxide, which may be in the form of rutile or anatase, and barium titanate, the percentage thereof may be up to fifty, suitably from about 5% to about 40% as $TiO_2$, with the remainder being composed of carnauba wax and ester gum in the proportions given above. It may be mentioned that although the molten mass may solidify during the cooling period and prior to the end thereof, nevertheless, the cooling is continued throughout the desired period which may be from about 0.5 to about 5 hours, more particularly, from about 1 to about 2 hours, and until the temperature has been lowered to about 18° C. or lower which may be about 0° C.

As an illustrative embodiment of a manner in which the invention may be practiced the following examples are presented.

*Example I*

Mixtures containing from about 10% to about 90% of carnauba wax with the remainder being ester gum is heated until a molten mass is obtained and this molten mass is then allowed to solidify under cooling, in an electric field, which may be either A.C. or D.C., having an impress of from 3,000 to 12,000 volts per centimeter. The electric field is maintained throughout the cooling period which is from about one to about two hours, with the cooling being gradual and with the temperature at the end of the cooling period being at least as low as 18° C. Electrets are thus obtained having the opposite surfaces carrying opposite charges and being of the nature of, and analogous to, a permanent magnet. Further, electrets may thus be produced having the following composition: 80% wax–20% ester gum; 60% wax–40% ester gum; and 30% wax–70% ester gum.

The electrets of this invention, comprising a wax of the class described, preferably carnauba wax, and ester gum, have marked advantages and superior properties as compared to electrets of carnauba wax alone or of wax plus various softeners or other fillers. This superiority is believed due to their strikingly distinct molecular orientation, which is evidenced by X-ray transmission patterns.

The X-ray transmission pattern of an electret prepared as stated above from a mixture of equal parts of carnauba wax and ester gum evidences an almost perfect four-point orientation. Each of the two most distinct rings show bands of strong intensity, separated by 180°, and the intense bands of each ring are removed by 90° from the intense bands of the other.

By contrast, a similarly prepared electret comprising equal parts of carnauba wax and hydrogenated rosin evidences relatively weak bands of intensity in the two most distinct rings of the X-ray transmission pattern. The difference in the two patterns when compared side-by-side is indeed striking. The same is true when mixtures of carnauba plus beeswax or other esters are similarly compared.

As a result of the distinctly different degree of molecular orientation of the electrets of this invention, they possess distinctly better and advantageous properties. Increasing the orientation of carnauba wax likewise increases its brittleness and proneness to cracking; the electrets of this invention, however, overcome this serious problem and are substantially free from cracking. The high degree of orientation also results in marked electrical effects, and makes possible better control over the electrical charge. An increased magnitude of surface electrical charge is obtained, and particularly, a density of charge on the negative surface substantially greater than that on the positive surface is easily provided, which makes the electrets particularly valuable in applications where a net negative charge is desired.

Further, the electrets of this invention are more stable, both electrically and physically. There is substantially no decomposition of the constituents especially when subjected to light; little discoloration due to the formation of colored substances, and negligible precipitating out of the constituents. Further, when the electret is provided with a "keeper," that is, having a metal foil attached thereto and forming a casing therefor, the charges upon surfaces decay less rapidly and have an opportunity to recover.

Electrets find many uses, and the improved electrets of this invention are for substantially all purposes superior to those heretofore known. One of the crudest uses is as a spark source, and a larger spark is obtained from the articles described herein by reason of their greater charge.

In more sophisticated electronic applications, the advantages of the electrets described herein become even more important. The improved physical properties make possible and prolong their use, and the intensity of charge greatly expands their field of usefulness. Systems embodying the present electrets as components are significantly more sensitive and suitable for use at very low frequencies. Fidelity of reproduction as when used in sound detection (e.g., in conjunction with a diaphragm, as a microphone) is much greater. Because they provide a greater electrostatic charge, they may be used to control electronic tube characteristics, as by establishing a bias for grid or screen elements, where previously known articles were ineffective. In general, the present devices are useful as permanently charged capacitors and thus obviate the need for the combination of capacitor and battery or other voltage source. Sensitive instruments not requiring other power source, such as electrometers, may also embody electrets.

Example II

The procedure of Example I may be followed utilizing ouricury wax in the place of carnauba wax.

Example III

The procedure of Example I may be followed utilizing refined sugar cane wax having a melting point of about 80° C. in the place of carnauba wax.

Example IV

The procedure of Example I may be followed using a mixture of waxes containing 20% carnauba, 20% ouricury and 25% refined sugar cane wax in place of carnauba wax.

Example V

The procedure of Example I may be followed using candelilla wax in the place of carnauba wax.

Example VI

An electret may be prepared to contain carnauba wax, ester gum, ethyl cellulose and hydrogenated rosin, by reducing a mixture thereof to the molten state and then permitting the molten mass to solidify in an electric field under the conditions given above in Example I. It has been found to be necessary to raise the temperature of such a mixture to from 200° to 220° C., depending upon the properties, particularly the viscosity, of the ethyl cellulose in order to reduce the entire mixture to the molten condition. Such a mixture may contain from 30% to 50% carnauba wax; from 20% to 50% ester gum; from 2% to 20% ethyl cellulose, and from 1% to 5% hydrogenated rosin. More especially, the mixture may contain about 45% carnauba wax; about 42% ester gum; about 11% ethyl cellulose, and about 2% hydrogenated rosin.

Example VII

The procedure of Example VI may be followed with utilization of refined sugar cane wax in place of the carnauba wax.

Example VIII

The procedure of Example V may be followed with the substitution of spermaceti for the carnauba wax.

Example IX

A mixture may be prepared having the constituents as set forth in any one of the foregoing examples with the addition thereto of an amount of a titanium compound which is about 30% of the entire mixture. The titanium compound may be titanium dioxide, either in the form of rutile or of anatase. The inclusion of the titanium compound reduces the particle size of the constituents, such as carnauba wax and ester gum, during the cooling period and decidedly increases the charges on the surfaces of the electret.

Example X

The procedure of Example IX may be followed utilizing barium titanate in place of titanium dioxide and in an amount of about 40% of the entire mixture.

This application is a continuation-in-part of my copending application Serial No. 379,459, filed September 10, 1953, now abandoned, and of my application Serial No. 59,987, filed November 13, 1948, now abandoned.

Since certain changes in carrying out the above method, and certain modifications in the article or composition which embody the invention, may be made without departing from its scope, it is intended that all matter contained in the above description shall be interpreted in an illustrative and not in a limited sense.

It is also to be understood that the following claims are intended to cover all of the generic and specific features of the invention herein described, and all statements of the scope of the invention which, as a matter of language, might be said to fall therebetween.

I claim:

1. As an article of manufacture, an electret consisting essentially of carnauba wax in an amount from about 10% to about 90%, and the remainder being ester gum.

2. The article of claim 1 in which said carnauba wax and said ester gum are present in equal amounts.

3. As an article of manufacture, an electret containing as essential constituents at least 10% ester gum and at least 10% of at least one wax selected from the group consisting of carnauba, sugar cane, montan, ozocerite, spermaceti, beeswax, ouricury, japan, bayberry, candelilla, Chinese and Chinese insect, the combined amount of said wax and said ester gum constituting a major proportion of said article.

4. An article according to claim 3 characterized in that it contains in minor proportion at least one member of the group consisting of ethyl cellulose, hydrogenated rosin, and methacrylate resin.

5. As an article of manufacture, an electret containing ester gum and at least one wax selected from the group consisting of carnauba, sugar cane, montan, ozocerite, spermaceti, beeswax, ouricury, japan, bayberry, candelilla, Chinese and Chinese insect, and also containing a titanium compound selected from the group consisting of titanium dioxide and barium titanate, said titanium compound comprising between about 5% to about 40% of the whole, said wax comprising between about 10% to about 90% of the whole, said ester gum comprising between about 10% to about 90% of the whole and the combined amount of said wax and said ester gum constituting a major proportion of said article.

References Cited in the file of this patent

Good et al.: "An Improved Method of Making Permanent Electrets and Factors Which Affect Their Behavior," Phys. Rev., vol. 56, Oct. 15, 1939, pages 810–813.

Gemant: "Recent Investigations on Electrets," Phil., Mag. S. 7, vol. 20, No. 136 Suppl. November 1935, pages 929–950.

Laughter: "Electret Construction," Radio-Craft, May 1948, pages 20, 21 and 82.